United States Patent
Ueda et al.

(10) Patent No.: US 7,168,237 B2
(45) Date of Patent: Jan. 30, 2007

(54) DETERIORATION DIAGNOSING DEVICE AND DIAGNOSING METHOD FOR EXHAUST GAS PURIFICATION CATALYST

(75) Inventors: Naoharu Ueda, Tokyo (JP); Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/063,181

(22) Filed: Feb. 23, 2005

(65) Prior Publication Data

US 2005/0188680 A1 Sep. 1, 2005

(30) Foreign Application Priority Data

Feb. 27, 2004 (JP) ............................. 2004-053376
Feb. 27, 2004 (JP) ............................. 2004-053454

(51) Int. Cl.
F01N 3/00 (2006.01)

(52) U.S. Cl. ..................... 60/277; 60/274; 60/276; 60/285

(58) Field of Classification Search ................. 60/274, 60/276, 277, 278, 280, 285
See application file for complete search history.

(56) References Cited

U.S. PATENT DOCUMENTS 5,732,553 A * 3/1998 Mitsutani .................... 60/276
5,737,916 A * 4/1998 Mitsutani .................... 60/276
5,921,078 A * 7/1999 Takaku et al. ............... 60/277
6,470,674 B1 * 10/2002 Yamaguchi et al. .......... 60/277
6,901,744 B2 * 6/2005 Kako et al. .................. 60/285

FOREIGN PATENT DOCUMENTS

JP 7-103039 A 4/1995

OTHER PUBLICATIONS

U.S. Appl. No. 11/063,869, filed Feb. 24, 2005, Emi et al.

* cited by examiner

Primary Examiner—Binh Q. Tran
(74) Attorney, Agent, or Firm—Foley & Lardner LLP (57) ABSTRACT

To determine whether an exhaust gas purification catalyst (42) of an engine (1) has deteriorated, first deterioration of the catalyst (42) is determined on the basis of an excess air ratio difference, which is a value expressing a difference in the oxygen concentration on the upstream side and downstream side of the catalyst (42). When the catalyst (42) is determined to have deteriorated on the basis of the excess air ratio difference, the air-fuel ratio of the engine (1) is feedback-controlled to a stoichiometric air-fuel ratio, and deterioration of the catalyst (42) is determined again on the basis of a value expressing a difference in the air-fuel ratio variation on the upstream side and downstream side of the catalyst (42) at that time.

20 Claims, 8 Drawing Sheets

DETERIORATION DIAGNOSING DEVICE AND DIAGNOSING METHOD FOR EXHAUST GAS PURIFICATION CATALYST

TECHNICAL FIELD OF THE INVENTION

This invention relates to the diagnosis of deterioration of an exhaust gas purification catalyst for an engine.

BACKGROUND OF THE INVENTION

A catalyst for purifying engine exhaust gas is provided in the exhaust passage of diesel engines and gasoline engines. JP7-103039A, published by the Japan Patent Office in 1995, discloses a technique for diagnosing whether or not the catalyst has deteriorated.

SUMMARY OF THE INVENTION

The device disclosed in JP7-103039A is applied to a gasoline engine. In this device, oxygen sensors having an output which varies binarily about a stoichiometric air-fuel ratio are provided before and after a three-way catalyst provided in an exhaust passage, and deterioration of the three-way catalyst is determined on the basis of the output of these two oxygen sensors.

In this determination method, the air-fuel ratio must be returned to the vicinity of the stoichiometric air-fuel ratio to determine whether or not the catalyst has deteriorated. Therefore, when the device disclosed in JP7-103039A is applied to a diesel engine or lean burn gasoline engine which operates mainly at a lean air-fuel ratio, the air-fuel ratio must be returned from the lean air-fuel ratio to the stoichiometric air-fuel ratio every time diagnosis is performed, which leads to a deterioration in fuel economy. Deterioration of the fuel economy may be avoided by restricting operations at the stoichiometric air-fuel ratio, but in so doing, the number of opportunities for determining whether or not the catalyst has deteriorated is reduced.

It is therefore an object of this invention to prevent deterioration of the fuel economy while securing opportunities for diagnosis, and to ensure that the precision with which catalyst deterioration is diagnosed does not decrease.

In order to achieve above object, this invention provides a catalyst deterioration diagnosing device comprising: an exhaust gas purification catalyst provided in an exhaust passage of an engine; an upstream side sensor which detects a characteristic of an exhaust gas on an upstream side of the catalyst; a downstream side sensor which detects a characteristic of the exhaust gas on a downstream side of the catalyst; and a controller into which a detection signal of the sensors is input.

The controller functions to: determine whether the catalyst has deteriorated on the basis of a value expressing a difference in an oxygen concentration on the upstream side and the downstream side of the catalyst, determined from the two detected values; and when the catalyst is determined to have deteriorated on the basis of the value expressing the difference in the oxygen concentration, feedback-control an air-fuel ratio of the engine to a stoichiometric air-fuel ratio, and determine again whether the catalyst has deteriorated on the basis of a value expressing a difference in an air-fuel ratio variation on the upstream side and the downstream side of the catalyst, determined from the two detected values.

The details as well as other features and advantages of this invention are set forth in the remainder of the specification and are shown in the accompanying drawings.

DESCRIPTION OF THE PREFERRED EMBODIMENTS

Figure 1:
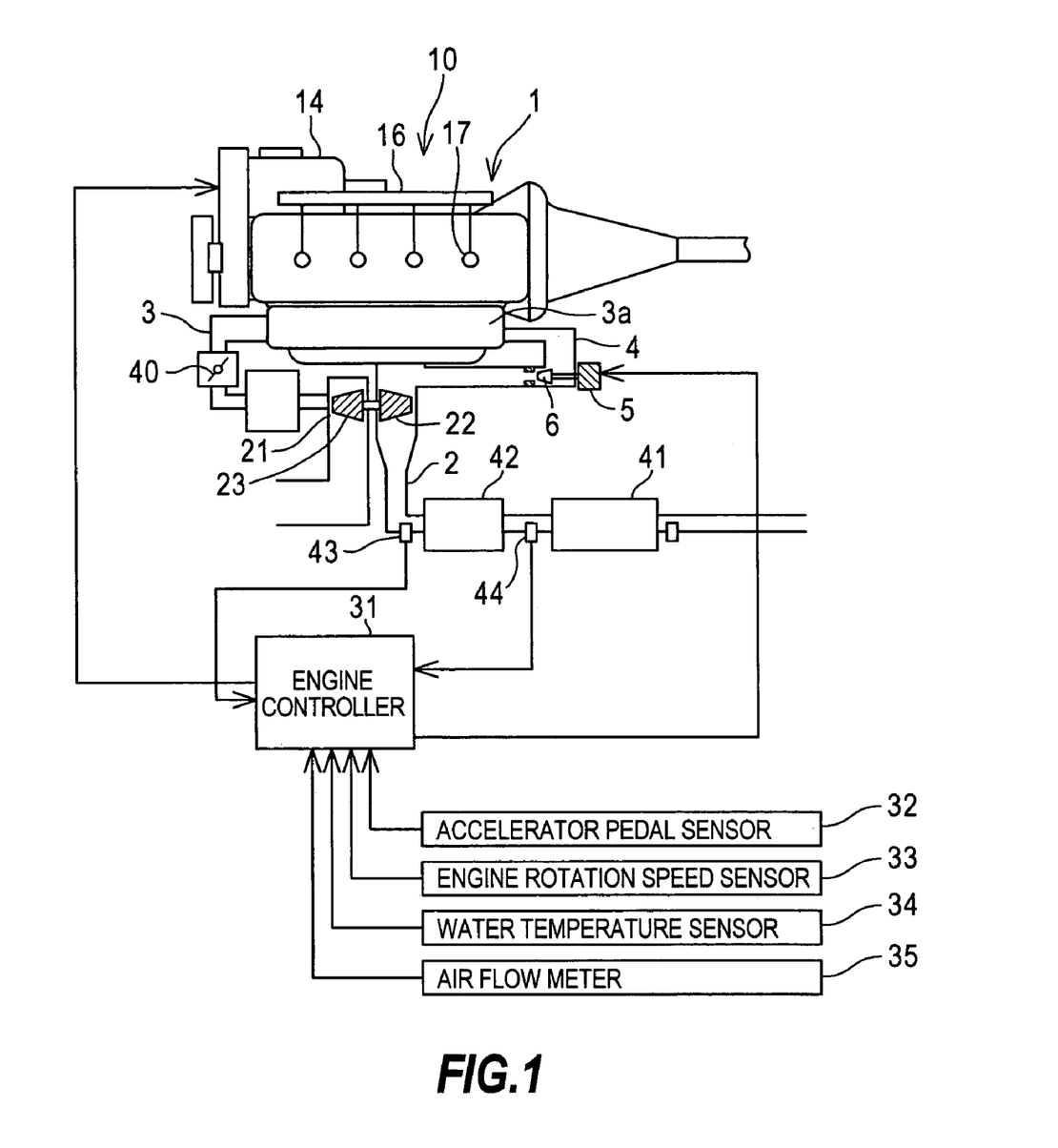
FIG. 1 is a schematic diagram of a diesel engine to which this invention is applied.

Referring to FIG. 1 of the drawings, a diesel engine 1 comprises an EGR passage 4 linking an exhaust passage 2 and a collector portion 3a of an intake passage 3. An EGR valve 6 driven by a step motor 5 is provided in the EGR passage 4. The step motor 5 is driven by a control signal from an engine controller 31, and thus a predetermined EGR rate corresponding to the operating condition is realized by regulating the amount of exhaust gas that is recirculated.

The engine 1 comprises a fuel injection device 10. The fuel injection device 10 mainly comprises a fuel tank (not shown), a supply pump 14, a common ail (accumulator) 16, and an injector 17 which is provided for each cylinder. Fuel that has been pressurized by the supply pump 14 is accumulated in the accumulator 16, whereupon the high-pressure fuel in the accumulator 16 is distributed among the injectors 17.

The injector 17 comprises a needle valve, a nozzle chamber, a fuel supply passage leading to the nozzle chamber, a retainer, a hydraulic piston, and a return spring. A three-way valve constituted by an electromagnetic valve is interposed in the fuel supply passage leading to the hydraulic piston. When the three-way valve is in an OFF state, the needle valve is in a sitting condition. When the three-way valve enters an ON state, the needle valve rises such that fuel is injected from an injection hole at the tip end of the injector. The fuel injection start timing is regulated by the timing at which the three-way valve is switched from OFF to ON, and the fuel injection amount is regulated by the length of the ON period. If the pressure in the accumulator 16 is constant, then the fuel injection amount increases as the ON period lengthens.

A variable capacity turbocharger 21, in which a turbine 22 that converts the thermal energy of exhaust gas into rotary energy and a compressor 23 that compresses intake air are connected coaxally, is provided on the exhaust passage 2 downstream of an opening portion of the EGR passage 4. A variable nozzle driven by an actuator is provided at a scroll inlet of the turbine 22, although not shown in the drawing. To obtain a predetermined boost pressure from a low rotation speed region, the variable nozzle is controlled by the engine controller 31 to a nozzle opening which increases the flow of exhaust gas into the turbine 22 (a tilting condition) on a low rotation speed side, and to a nozzle opening which allows exhaust gas to enter the turbine 22 without resistance (a fully open condition) on a high rotation speed side.

A throttle 40 driven by an actuator, not shown in the drawing, is provided at an inlet to the collector 3a.

In the engine controller 31, into which signals from an accelerator pedal sensor 32, a sensor 33 which detects an engine rotation speed and a crank angle, a water temperature sensor 34, and an air flow meter 35 are input, EGR control and boost pressure control are performed in a coordinated fashion to obtain a target EGR rate and a target boost pressure on the basis of these signals.

A filter 41 which traps particulate matter contained in the exhaust gas is disposed in the exhaust passage 2. When the trapped amount of particulate matter in the filter 41 reaches a predetermined value, the air-fuel ratio of the engine 1 is switched from a lean air-fuel ratio to the stoichiometric air-fuel ratio or a rich air-fuel ratio in order to raise the exhaust gas temperature so that the particulate matter trapped in the filter 41 is burned, and thus removed.

An HC trap catalyst 42 is provided on the upstream side of the filter 41. The HC trap catalyst 42 traps HC when the exhaust gas temperature is low, and when the exhaust gas rises to or above a predetermined temperature, the trapped HC is discharged through desorption and purified by oxidation using oxygen in the exhaust gas.

Wide range air-fuel ratio sensors 43, 44 which can detect the air-fuel ratio in a linear fashion are provided before and after the HC trap catalyst 42. The engine controller 31 performs the following two-stage diagnosis of deterioration of the catalyst 42 based on the outputs of the sensor 43 on the upstream side of the catalyst 42 and the sensor 44 on the downstream side of the catalyst 42.

First Deterioration Diagnosis

The engine 1 is a diesel engine, and therefore frequently operates at a lean air-fuel ratio. In the first deterioration diagnosis, a determination is made as to whether or not the HC trap catalyst 42 has deteriorated on the basis of an excess air ratio before and after the catalyst, detected by the upstream side sensor 43 and downstream side sensor 44, while the engine 1 operates at a lean air-fuel ratio.

As will be described hereafter, however, with this deterioration determining method, a misdiagnosis may occur in a region where the excess air ratio at the catalyst inlet is in the vicinity of 1.0 due to measurement irregularities in the sensors 43, 44. Hence, even when the catalyst 42 is determined to have deteriorated, the diagnosis does not end, but instead deterioration of the catalyst 42 is determined again by means of the following second deterioration diagnosis.

Second Deterioration Diagnosis

In the second deterioration diagnosis, a DOS diagnosis is performed. The DOS diagnosis is a diagnosing method used to determine whether or not the catalyst 42 has deteriorated on the basis of the outputs of the upstream side sensor 43 and the downstream side sensor 44 while switching the air-fuel ratio of the engine 1 from a lean air-fuel ratio to the stoichiometric air-fuel ratio, and performing air-fuel ratio feedback control based on the output of the upstream side sensor 43. Even when the catalyst 42 is determined to have deteriorated in the first deterioration diagnosis, if the catalyst 42 is determined not to have deteriorated in the second deterioration diagnosis, the diagnosis result of the first deterioration diagnosis is ignored as erroneous.

The reason for performing a deterioration diagnosis in two stages as described above is that in the first deterioration diagnosis, a misdiagnosis may occur in the region where the excess air ratio is in the vicinity of 1.0, whereas in the second deterioration diagnosis, the diagnosis precision is high, and misdiagnoses are unlikely to occur. However, to perform the second deterioration diagnosis, the air-fuel ratio must be switched from a lean air-fuel ratio to the stoichiometric air-fuel ratio, and therefore if the second deterioration diagnosis is performed at all times, the fuel economy deteriorates. Hence, in order to prevent deterioration of the fuel economy while securing opportunities for diagnosis, the first deterioration diagnosis is performed initially, and the second deterioration diagnosis is performed only when the catalyst 42 is determined to have deteriorated.

It should be noted, however, that when the engine 1 operates at the stoichiometric air-fuel ratio, it is highly unlikely that an effective diagnosis will be performed by means of the first deterioration diagnosis, and therefore the second deterioration diagnosis is performed immediately, omitting the first deterioration diagnosis. It should also be noted that even diesel engines sometimes operate at a rich air-fuel ratio, but in these cases, the two-stage deterioration diagnosis described above is performed.

The ability to diagnose deterioration of the catalyst 42 while operating at a lean air-fuel ratio, as described above, has come about on the basis of the following new knowledge regarding the catalyst 42.

Figure 2:
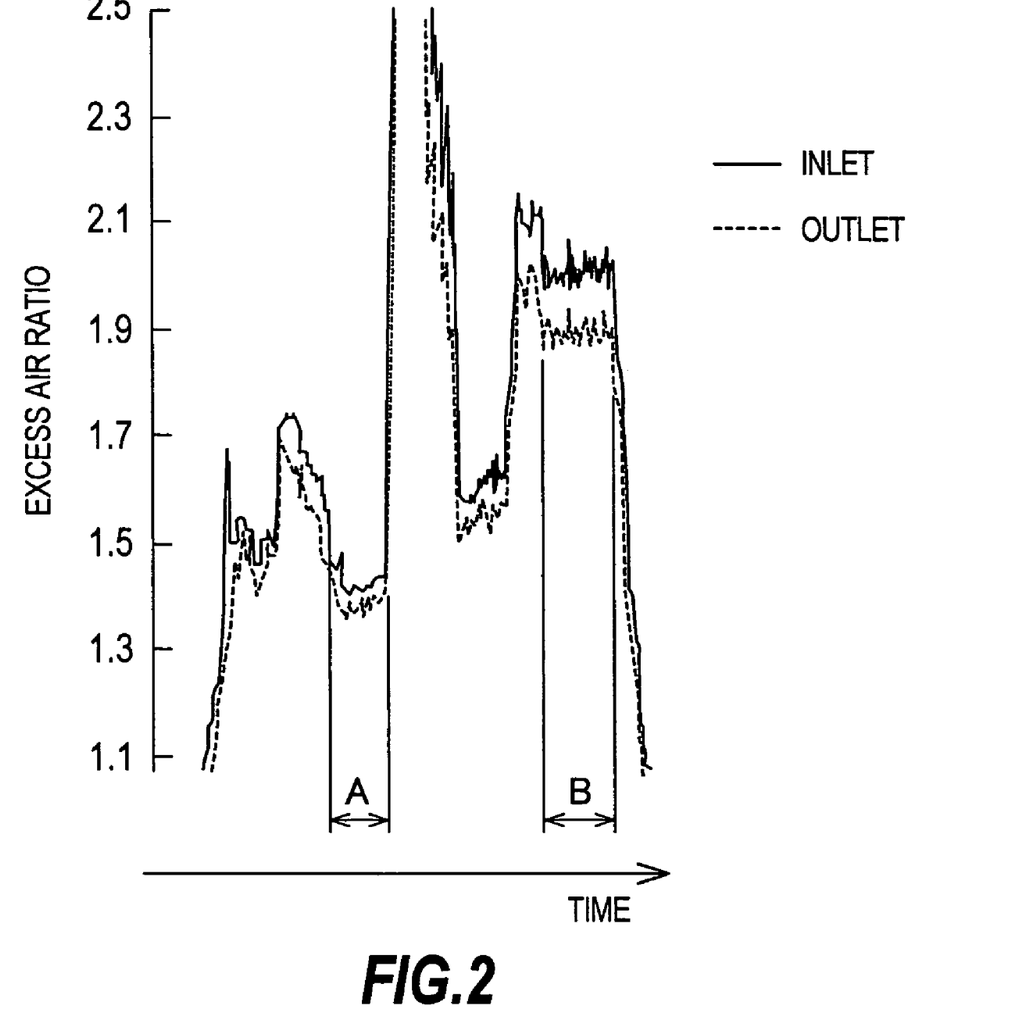
FIG. 2 is a wave form chart showing variation in an excess air ratio at a catalyst inlet and a catalyst outlet when the diesel engine is operative.

FIG. 2 shows actual variation in the excess air ratio at the inlet and outlet of the catalyst 42 when the engine 1 is operated according to a predetermined operating mode. The engine 1 operates with a target excess air ratio of approximately 1.4 in a section A, and a target excess air ratio of approximately 1.9 in a section B. The actual excess air ratio at the inlet to the catalyst 42 at this time varies from approximately 1.4 in the section A to approximately 1.9 in the section B (substantially equal to the target excess air ratio), whereas the actual excess air ratio at the outlet of the catalyst 42 shifts to a larger side (leaner side) than the excess air ratio at the catalyst inlet in both sections A and B. Moreover, the difference between the excess air ratio at the outlet of the catalyst 42 and the excess air ratio at the catalyst inlet is greater in the section B than the section A. The excess air ratio is supposed to be identical before and after the catalyst, and hence this difference in the excess air ratio before and after the catalyst is an anomalous phenomenon.

Figure 3:
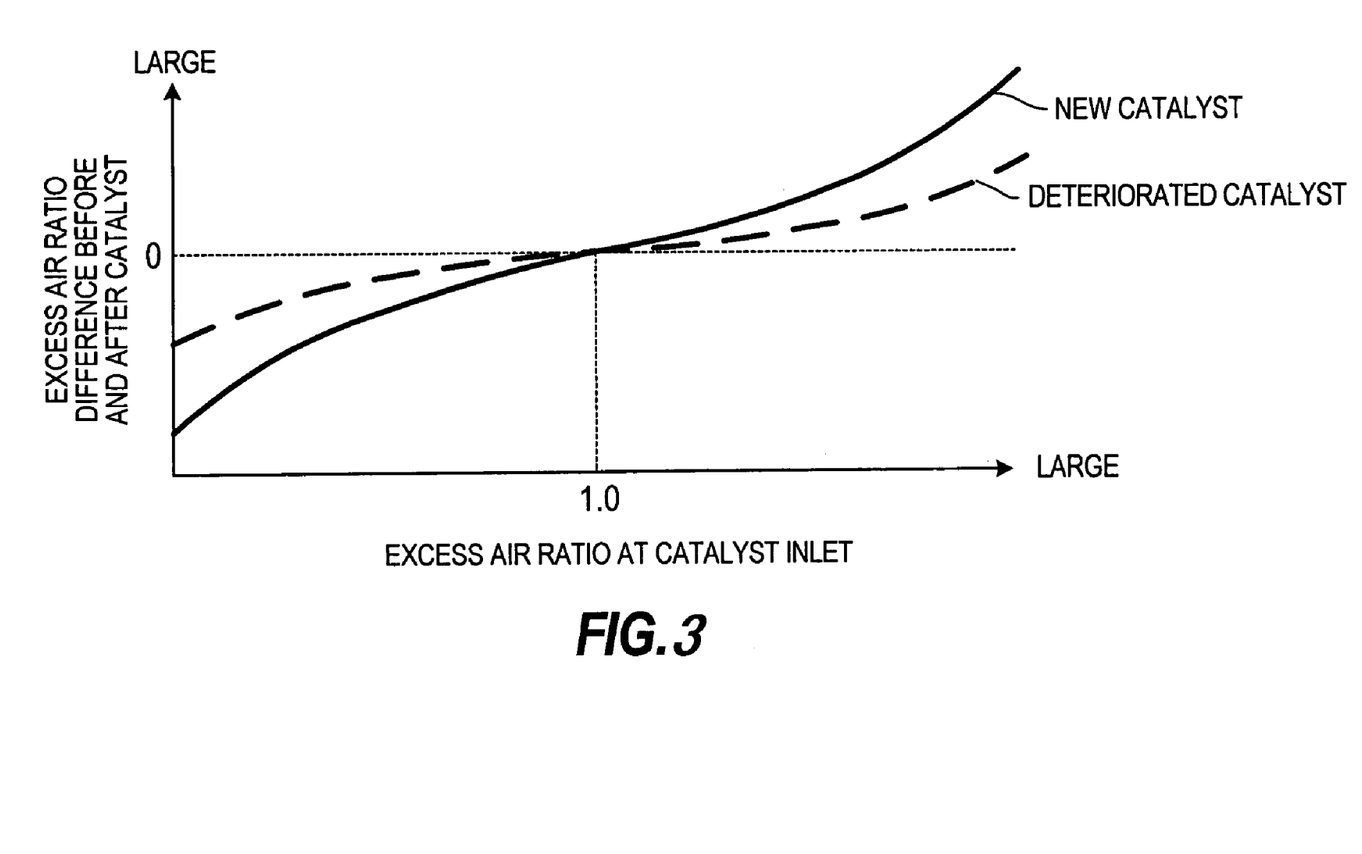
FIGS. 3–5 are characteristic diagrams showing differences in an excess air ratio before and after the catalyst.

As a result of further investigation, the experiment result shown in FIG. 3 was obtained. When the excess air ratio at the inlet to the catalyst 42 is plotted on the abscissa, and the difference between the excess air ratio at the inlet to the catalyst 42 and the excess air ratio at the outlet of the catalyst 42 (the excess air ratio difference before and after the catalyst) is plotted on the ordinate, it was learned that the excess air ratio difference before and after the catalyst 42 increases as the excess air ratio at the inlet to the catalyst 42 rises above 1.0, or in other words shifts to the lean side from the stoichiometric air-fuel ratio, and conversely, the excess air ratio difference before and after the catalyst 42 increases as the excess air ratio at the inlet to the catalyst 42 falls below 1.0, or in other words shifts to the rich side from the stoichiometric air-fuel ratio. It was also learned that when the catalyst 42 deteriorates, the difference in the excess air ratio before and after the catalyst is smaller than when the catalyst is new.

Therefore, using the characteristic shown in FIG. 3, deterioration of the catalyst 42 can be diagnosed in the region where the excess air ratio is greater than 1.0, or in other words further toward the lean side than the stoichiometric air-fuel ratio, and in the region where the excess air ratio is smaller than 1.0, or in other words further toward the rich side than the stoichiometric air-fuel ratio.

As yet, the reason why a difference in the excess air ratio before and after the catalyst 42 occurs in the region where the excess air ratio exceeds 1.0 has not been fully grasped, but the following reasons may be considered.

The principle harmful components that are discharged from the diesel engine 1 at low temperatures are HC and CO, but these components are converted into harmless $H_2O$ and $CO_2$ through oxidation using the catalyst. The water $H_2O$ adheres to a precious metal (platinum, for example) serving as the catalyst, and is thus ionized into hydrogen $H_2$ and an oxygen ion $O_2$—. It is believed that the downstream side wide range air-fuel ratio sensor 44 may detect the oxygen ion part as oxygen, leading to output indicating that the oxygen concentration is greater in the downstream side sensor 44 than the upstream side sensor 43. In other words, it is believed that a difference in the excess air ratio before and after the catalyst may occur in the region where the excess air ratio exceeds 1.0 due to this water $H_2O$.

To determine whether the catalyst characteristic shown in FIG. 3 is unique to the HC trap catalyst 42, a similar experiment was conducted on other catalysts (a NOx trap catalyst, a three-way catalyst, an oxidation catalyst, and so on). As a result, it was determined that a similar characteristic to the characteristic shown in FIG. 3 is obtained for any catalyst, regardless of type. Accordingly, catalyst deterioration can be diagnosed on the basis of the excess air ratio difference regardless of the type of engine and catalyst.

Figure 4:
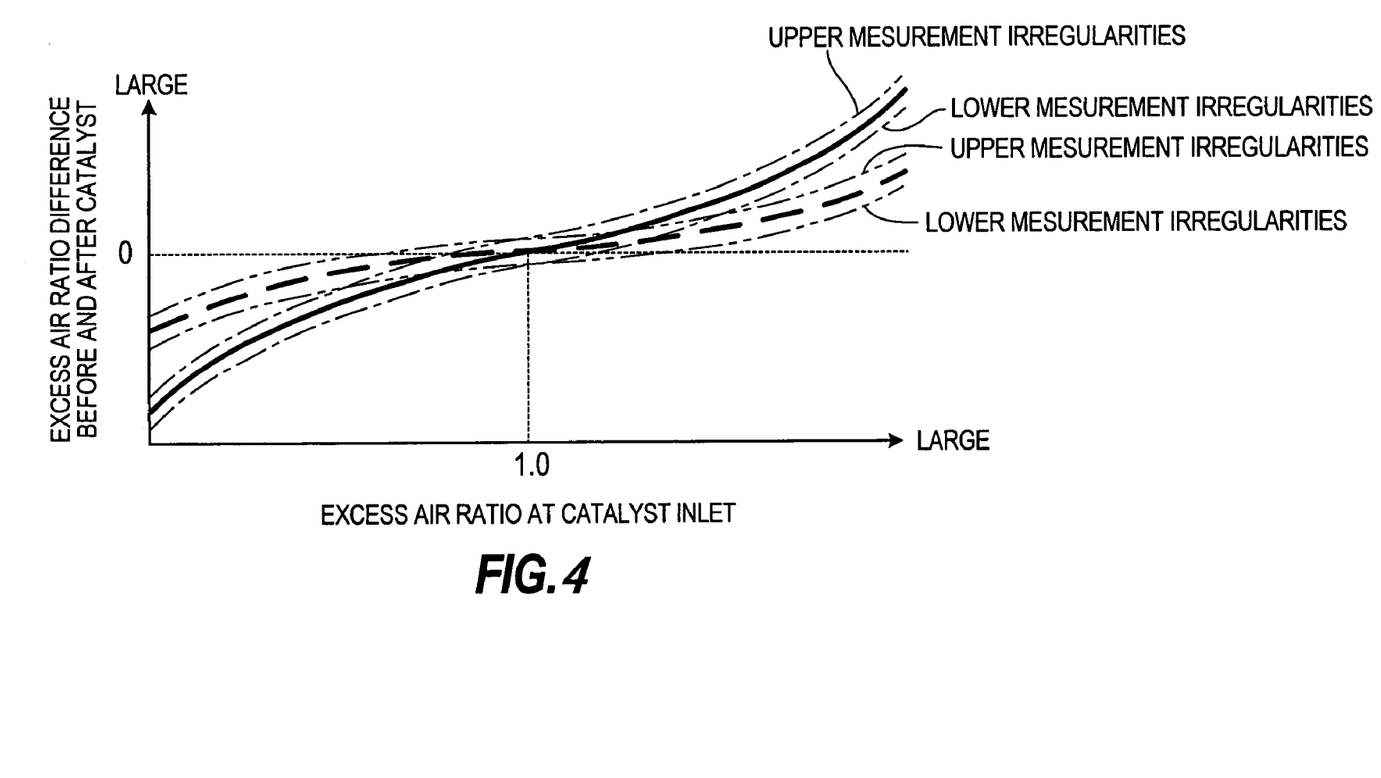

It should be noted, however, that in reality, the excess air ratio difference is small in the region where the excess air ratio is in the vicinity of 1.0, and measurement irregularities occur in the upstream side sensor 43 and downstream side sensor 44. As a result, the excess air ratio at the catalyst inlet and the excess air ratio at the catalyst outlet both fluctuate to a certain degree, as shown in FIG. 4. In FIG. 4, the range of this fluctuation is shown by dot-dash lines for the excess air ratio at the catalyst outlet, and by dot-dot-dash lines for the excess air ratio at the catalyst inlet. Hence in the region where the excess air ratio at the catalyst inlet is in the vicinity of 1.0, even when the excess air ratio difference before and after the catalyst is determined, it is impossible to know whether or not the obtained result is really the excess air ratio difference before and after the catalyst.

Therefore, in the region where the excess air ratio is in the vicinity of 1.0, even though the catalyst 42 has not deteriorated and the actual excess air ratio difference before and after the catalyst 42 has not decreased, the excess air ratio difference may be detected as having decreased due to measurement irregularities in the upstream side sensor 43 and downstream side sensor 44, leading to a misdiagnosis indicating that the catalyst 42 has deteriorated. Conversely, even though the catalyst 42 has deteriorated and the actual excess air ratio difference before and after the catalyst 42 has decreased, the excess air ratio difference may be detected as having increased due to measurement irregularities, leading to a misdiagnosis indicating that the catalyst 42 has not deteriorated.

Figure 5:
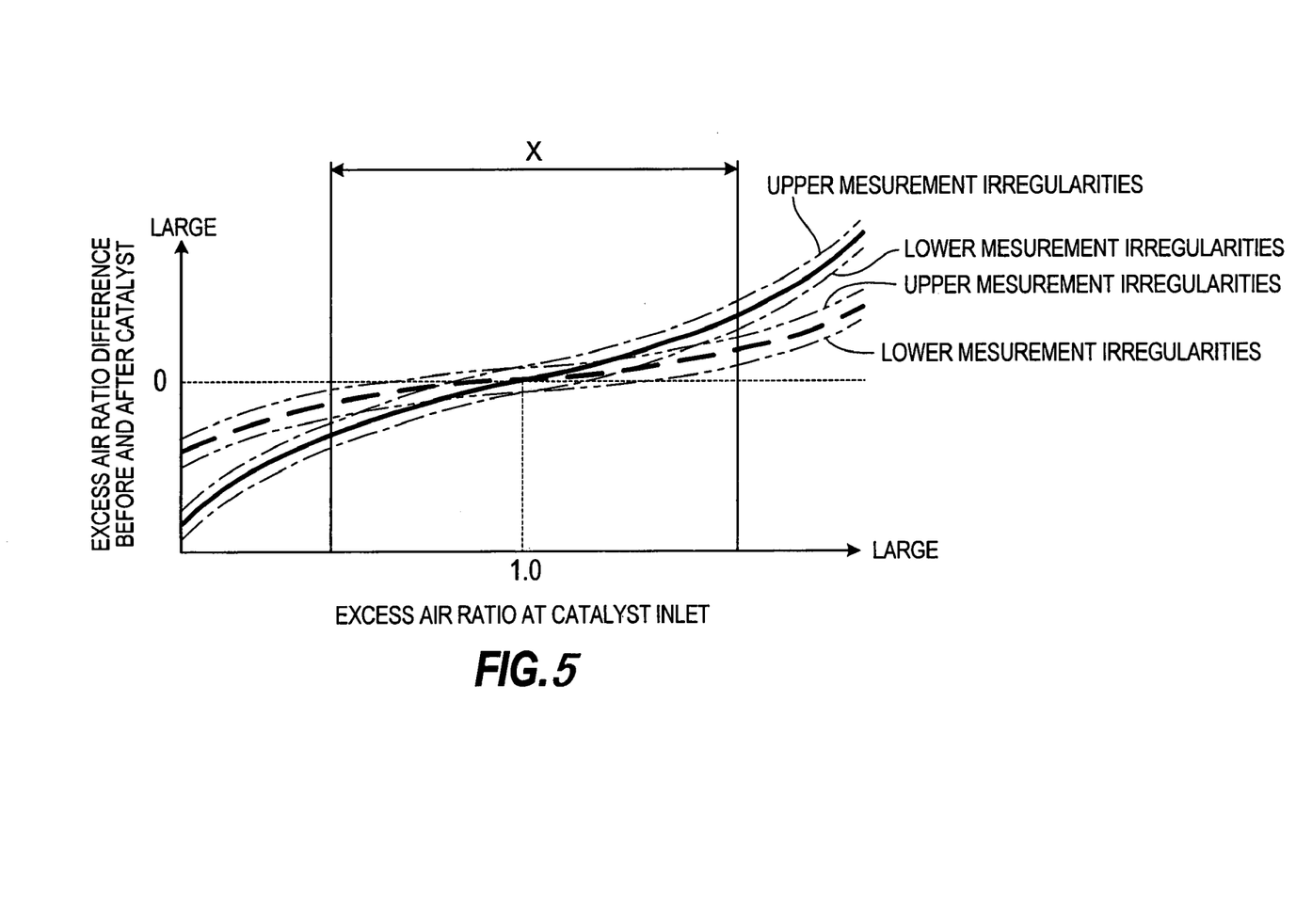

Hence, as shown in FIG. 5, in region X where the excess air ratio at the inlet to the catalyst 42 is in the vicinity of 1.0, a DOS diagnosis may be performed immediately, without performing catalyst deterioration diagnosis based on the excess air ratio difference.

However, when such a method of switching between the two types of diagnosis in every excess air ratio region is employed, boundary values must be set to divide the regions, thereby increasing the number of steps. Therefore, in this embodiment, when the engine 1 operates in regions other than the stoichiometric air-fuel ratio, catalyst deterioration diagnosis is performed initially on the basis of the excess air ratio difference before and after the catalyst 42, and when it is determined as a result that the catalyst 42 may have deteriorated, deterioration of the catalyst 42 is determined using the more precise DOG diagnosis.

It should be noted that when the engine 1 operates at the stoichiometric air-fuel ratio, it is difficult to diagnose catalyst deterioration effectively on the basis of the excess air ratio difference before and after the catalyst 42, and therefore the DOS diagnosis is performed immediately, omitting catalyst deterioration diagnosis based on the excess air ratio difference before and after the catalyst 42.

Figure 6:
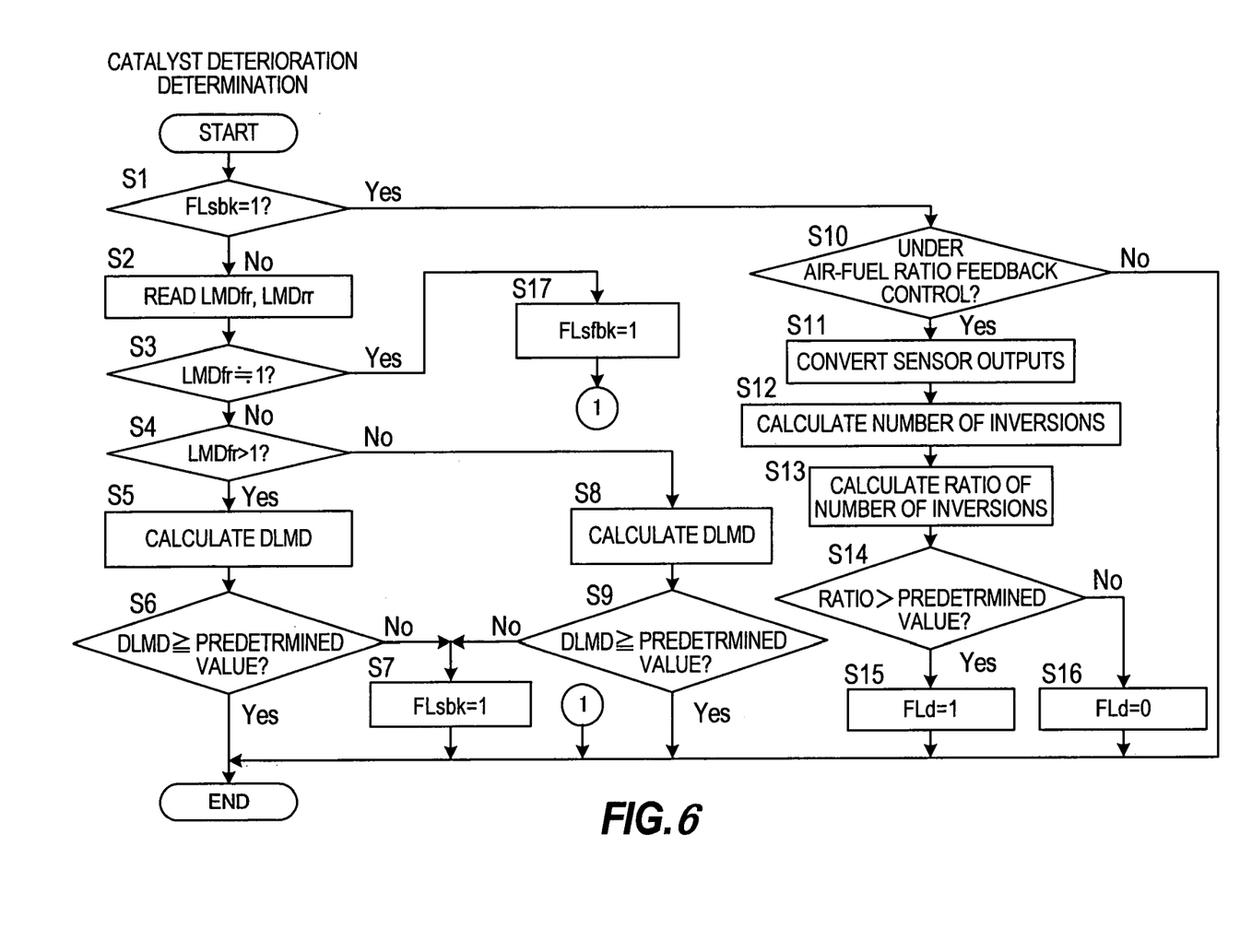
FIG. 6 is a flowchart of catalyst deterioration determination processing, performed by an engine controller.

The processing described above is executed by the engine controller 31. FIG. 6 shows this catalyst deterioration determination processing, which is performed by the engine controller 31 at fixed time intervals, for example every ten milliseconds.

In a step S1, a stoichiometric feedback flag FLsfbk (which is set initially to zero at the time of start-up of the engine 1) is checked. When the flow in FIG. 6 is executed for the first time, the stoichiometric feedback flag FLsfbk is zero, and hence the flow advances to a step S2, where an excess air ratio LMDfr at the inlet to the catalyst 42 and an excess air ratio LMDrr at the outlet of the catalyst 42 are read. The excess air ratios LMDfr and LMDrr are values obtained by dividing the air-fuel ratios detected by the upstream side sensor 43 and downstream side sensor 44 respectively by the stoichiometric air-fuel ratio of 14.7.

In steps S3, S4, the excess air ratio LMDfr at the inlet to the catalyst 42 is compared to a value 1.0 to determine whether the engine 1 is operating at a lean air-fuel ratio, a rich air-fuel ratio, or the stoichiometric air-fuel ratio. When the excess air ratio LMDfr at the inlet to the catalyst 42 is greater than 1.0, it is determined that the engine 1 is operating at a lean air-fuel ratio, and the flow advances to a step S5 and onward. When the excess air ratio LMDfr at the inlet to the catalyst 42 is smaller than 1.0, it is determined that the engine 1 is operating at a rich air-fuel ratio, and the flow advances to a step S8 and onward. When the excess air ratio LMDfr at the inlet to the catalyst 42 is substantially 1.0, it is determined that the engine 1 is operating at the stoichiometric air-fuel ratio, and the flow advances to a step S17.

First, processing during an operation at a lean air-fuel ratio will be described. In the step S5, an absolute value of the difference between the excess air ratio LMDrr at the outlet of the catalyst 42 and the excess air ratio LMDfr at the inlet to the catalyst 42 is calculated as an excess air ratio difference DLMD before and after the catalyst 42 using the following equation.

$$DLMD=|LMDrr-LMDfr| \qquad (1)$$

In a step S6, the excess air ratio difference DLMD before and after the catalyst 42 is compared to a predetermined value. If the excess air ratio difference DLMD is equal to or greater than the predetermined value, it is determined that the catalyst 42 has not yet deteriorated, and the current processing ends as is. If, on the other hand, the excess air ratio difference DLMD is less than the predetermined value, it is determined that the catalyst 42 may have deteriorated, and hence the flow advances from the step S6 to a step S7, where FLsfbk is set to "1". The current processing then ends.

Next, processing during an operation at a rich air-fuel ratio will be described. Processing during an operation at a rich air-fuel ratio is similar to the processing performed during an operation at a lean air-fuel ratio. More specifically, in the step S8, the absolute value of the difference between the excess air ratio LMDfr at the inlet to the catalyst 42 and the excess air ratio LMDrr at the outlet of the catalyst 42 is calculated as the excess air ratio difference DLMD before and after the catalyst 42 using the following equation.

$$DLMD=|LMDfr-LMDrr| \qquad (2)$$

In a step S9, the excess air ratio difference DLMD before and after the catalyst 42 is compared to a predetermined value. If the excess air ratio difference DLMD is equal to or greater than the predetermined value, it is determined that the catalyst 42 has not yet deteriorated, and the current processing ends as is. If, on the other hand, the excess air ratio difference DLMD is less than the predetermined value, it is determined that the catalyst 42 may have deteriorated, and hence the flow advances from the step S9 to the step S7, where FLsfbk is set to "1". The current processing then ends.

The aforementioned predetermined values used in the steps S6, S9 are each set to a value according to the exhaust performance required of the engine 1, or in other words to a value at which the exhaust gas purification performance required of the catalyst 42 can be secured to a minimum degree.

During an operation in the vicinity of the stoichiometric air-fuel ratio, FLsfbk is set to "1" in the step S17, whereupon the current processing ends.

Once FLsfbk has been set to "1", the amount of fuel supplied to the engine 1 is adjusted so that the air-fuel ratio of the engine 1 reaches the stoichiometric air-fuel ratio (that is, so that the excess air ratio reaches 1.0), and air-fuel ratio feedback control is performed on the basis of the output of the upstream side sensor 43. The air-fuel ratio feedback control that is performed on a gasoline engine may be used without modification for this air-fuel ratio feedback control.

It should be noted that in the air-fuel ratio feedback control that is performed on a gasoline engine, the upstream side sensor is an oxygen sensor which varies binarily about the stoichiometric air-fuel ratio, and hence this is actually pseudo-proportional integral control rather than feedback control. In this embodiment, however, a wide range air-fuel ratio sensor is used as the upstream side sensor 43, and therefore non-pseudo feedback control (for example, proportional control, integral control, proportional integral control, and so on) may be performed.

When FLsfbk has been set at "1", during the next flow, processing advances from the step S1 to a step S10, where a determination is made as to whether or not air-fuel ratio feedback control is underway. If air-fuel ratio feedback control is not underway, the current processing ends as is.

If air-fuel ratio feedback control is underway, processing advances to a S11 and onward. In steps S11–S16, the DOS diagnosis is performed. The DOS diagnosis is a method of diagnosing catalyst deterioration in a gasoline engine, which is used in a so-called double $O_2$ sensor system. However, this method may also be applied to a diesel engine by operating the diesel engine at the stoichiometric air-fuel ratio.

Figure 7:
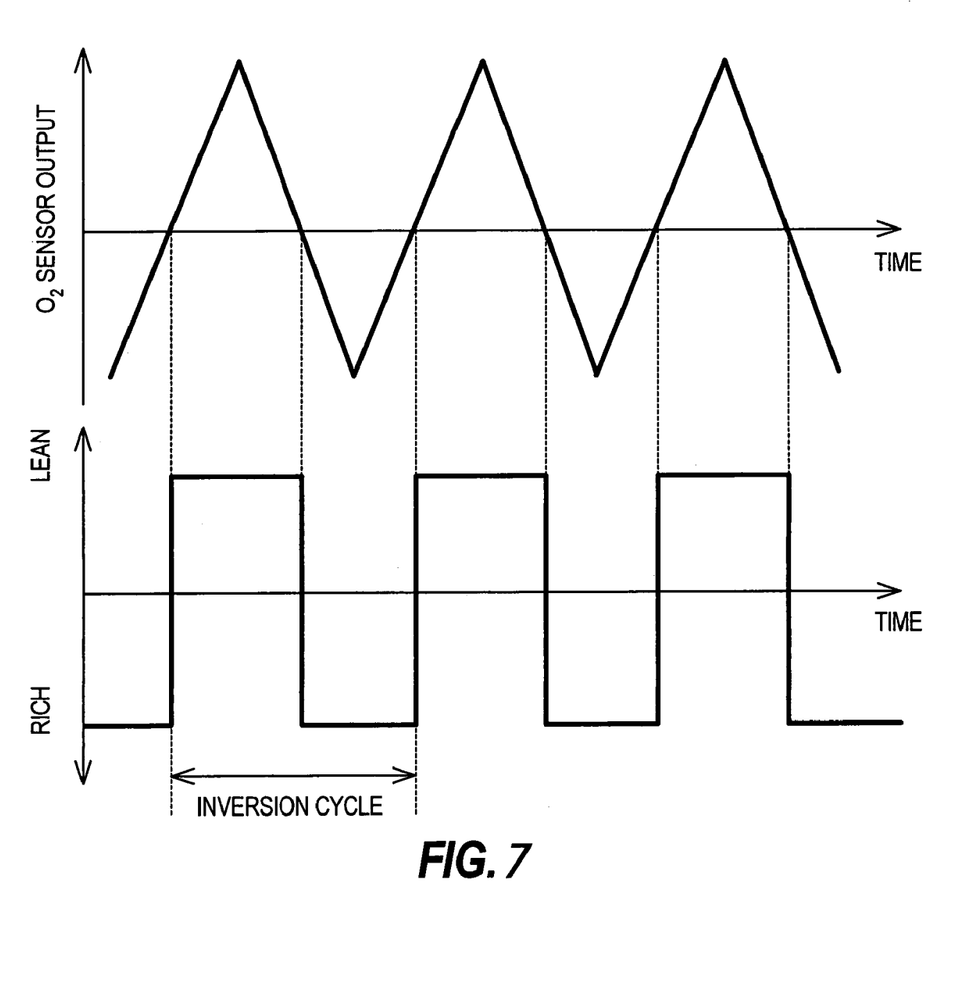
FIG. 7 is a wave form chart obtained by converting a sensor output.

First, as shown in FIG. 7, the outputs of the upstream side sensor 43 and downstream side sensor 44 (see upper section of FIG. 7) are both converted into pulse wave forms (see lower section of FIG. 7) in the step S11.

In a step S12, a number of inversions Nfr, Nrr per predetermined time period (or an inversion cycle PERIODfr, PERIODrr) of the output of the upstream side sensor 43 and the output of the downstream side sensor 44 is calculated from the converted wave forms.

In a step S13, a ratio RATIO of the number of inversions per predetermined time period of the output of the upstream side sensor 43 and the output of the downstream side sensor 44 is calculated using the following equation.

$$RATIO = Nrr/Nf \quad (3)$$

Alternatively, a ratio RATIOt of the inversion cycle of the output of the upstream side sensor 43 and the output of the downstream side sensor 44 is calculated using the following equation.

$$RATIOt = PERIODfr/PERIODrr \quad (4)$$

Figure 8:
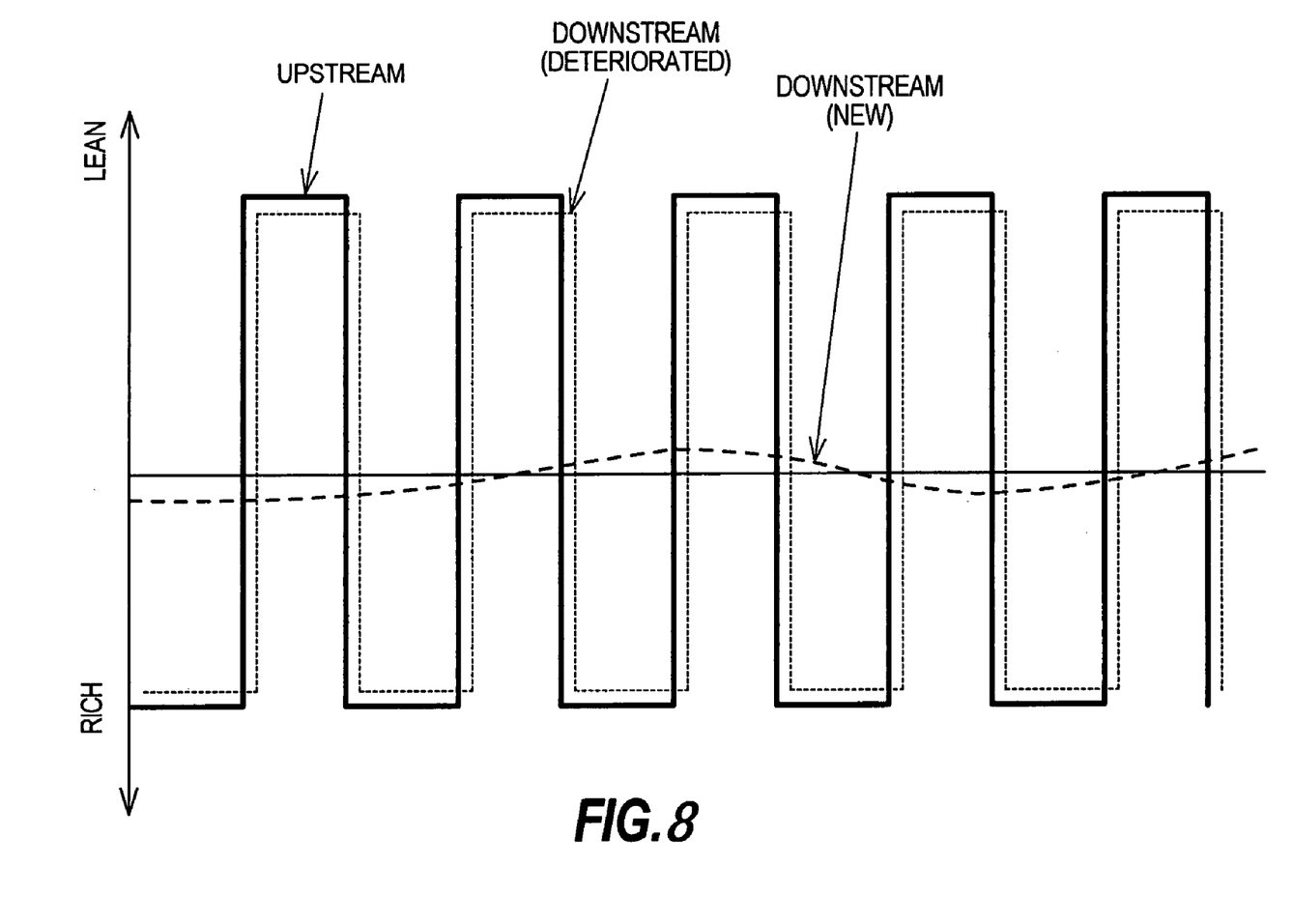
FIG. 8 is a wave form chart illustrating a DOS diagnosis.

As shown in FIG. 8, the air-fuel ratio at the inlet to the catalyst 42 inverts up and down across the stoichiometric air-fuel ratio in a short cycle during air-fuel ratio feedback control. On the other hand, the air-fuel ratio at the outlet of the catalyst 42 varies slowly when the catalyst 42 is new, but inverts up and down across the stoichiometric air-fuel ratio in a substantially identical cycle to the air-fuel ratio at the inlet to the catalyst 42 when the catalyst 42 has deteriorated. In other words, the number of inversions ratio RATIO shown in Equation (3) or the inversion cycle ratio RATIOt in Equation (4) takes a much smaller value than one when the catalyst 42 is new, but takes a value in the vicinity of one when the catalyst has deteriorated.

In a step S14, the number of inversions ratio RATIO (or the inversion cycle ratio RATIOt) is compared to a predetermined value. When the number of inversions ratio RATIO (or the inversion cycle ratio RATIOt) is equal to or less than the predetermined value, the flow advances to a step S16, where a deterioration flag FLd is set to zero. The current processing then ends. If, on the other hand, the number of inversions ratio RATIO (or the inversion cycle ratio RATIOt) exceeds the predetermined value, the flow advances from the step S14 to a step S15, where the catalyst 42 is determined to have deteriorated, and the deterioration flag FLd is set to "1".

It should be noted that in the step S3, a determination is made as to whether or not the excess air ratio LMDfr at the inlet to the catalyst 42 equals one, and if so, the DOS diagnosis is performed immediately. However, the step S3 may be eliminated such that when the excess air ratio LMDfr at the inlet to the catalyst 42 equals one, the flow advances to the step S4 and onward, where the deterioration diagnosis based on the excess air ratio difference is performed initially, and the DOS diagnosis is performed only when the catalyst 42 is determined to have deteriorated according to the deterioration diagnosis based on the excess air ratio difference.

Next, the actions and effects of this embodiment will be described.

In this embodiment, the excess air ratio LMDfr, LMDrr before and after the catalyst 42 is detected even when the engine 1 operates at a lean air-fuel ratio or a rich air-fuel ratio, and the catalyst 42 is determined to have deteriorated when the detected excess air ratio difference DLMD before and after the catalyst 42 falls below a predetermined value. Since deterioration of the catalyst 42 can be diagnosed even when the engine 1 operates at a lean air-fuel ratio or a rich air-fuel ratio, the air-fuel ratio does not have to be switched to the stoichiometric air-fuel ratio in order to perform a diagnosis. Particularly in the case of an engine which operates at a lean air-fuel ratio, such as a diesel engine, there is no need to switch from the lean air-fuel ratio to the stoichiometric air-fuel ratio, and hence the fuel consumption amount can be suppressed.

When deterioration of the catalyst 42 is determined on the basis of the excess air ratio difference before DLMD and after the catalyst 42, the diagnosis precision may decrease due to measurement irregularities in the upstream side and downstream side sensors 43, 44 in the region where the excess air ratio at the inlet to the catalyst 42 is in the vicinity of 1.0, and this may lead to a misdiagnosis indicating that the catalyst 42 has deteriorated when it has not. In this embodiment, however, when the catalyst 42 is determined to have deteriorated according to a deterioration diagnosis based on the excess air ratio difference DLMD before and after the catalyst 42, another diagnosis is performed by means of the highly precise DOS diagnosis. As a result, deterioration of the fuel economy can be prevented while securing opportunities for diagnosis, and a high degree of deterioration diagnosis precision can be ensured.

In the embodiment described above, the sensors 43, 44 are wide range air-fuel ratio sensors, but the sensors 43, 44 may be so-called oxygen sensors having an output which varies binarily about the stoichiometric air-fuel ratio. As long as the output of the oxygen sensors varies even slightly in relation to the air-fuel ratio in the lean air-fuel ratio region, excluding the vicinity of the stoichiometric air-fuel ratio, then the oxygen sensors may be used in a similar fashion to the wide range air-fuel ratio sensors.

Furthermore, in this embodiment a case was described in which the excess air ratio is used, but the air-fuel ratio may be used instead of the excess air ratio.

Also in this embodiment, a case was described in which the engine 1 is a diesel engine, but the engine 1 may be a gasoline engine.

The entire contents of Japanese Patent Applications P2004-053376 and P2004-053454 (filed Feb. 27, 2004) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A catalyst deterioration diagnosing device comprising:
an exhaust gas purification catalyst provided in an exhaust passage of an engine;
an upstream side sensor which detects a characteristic value of an exhaust gas on an upstream side of the catalyst;
a downstream side sensor which detects a characteristic value of the exhaust gas on a downstream side of the catalyst; and
a controller into which a detection signal of the sensors is input, functioning to:
determine the engine air-fuel ratio operating condition;
when the engine air-fuel ratio operating condition is determined to be a non-stoichiometric air-fuel ratio operating condition, determine whether the catalyst has deteriorated on the basis of a value expressing a difference in an oxygen concentration on the upstream side and an oxygen concentration on the downstream side of the catalyst, determined from the two detected characteristic values; and
when the engine air-fuel ratio operating condition is determined to be a non-stoichiometric air-fuel ratio operating condition, and the catalyst is determined to have deteriorated on the basis of the value expressing the difference in the oxygen concentration, feedback-control an air-fuel ratio of the engine to a stoichiometric air-fuel ratio, and determine again whether the catalyst has deteriorated on the basis of a value expressing a difference in an air-fuel ratio variation on the upstream side and the downstream side of the catalyst, determined from the two detected characteristic values.

2. The device as defined in claim 1, wherein, when the engine air-fuel ratio operating condition is determined to be a stoichiometric air-fuel ratio operating condition, the controller feedback-controls the air-fuel ratio of the engine to the stoichiometric air-fuel ratio, and determines whether the catalyst has deteriorated on the basis of the value expressing the difference in the air-fuel ratio variation, without determining whether the catalyst has deteriorated on the basis of the value expressing the difference in the oxygen concentration.

3. The device as defined in claim 1, wherein the value expressing the difference in the oxygen concentration on the upstream side and the downstream side of the catalyst is a difference between an excess air ratio on the upstream side of the catalyst and an excess air ratio on the downstream side of the catalyst.

4. The device as defined in claim 3, wherein the catalyst is determined to have deteriorated when the difference between the excess air ratio on the upstream side of the catalyst and the excess air ratio on the downstream side of the catalyst is greater than a predetermined value.

5. The device as defined in claim 1, wherein the value expressing the difference in the air-fuel ratio variation on the upstream side and the downstream side of the catalyst is a ratio of a number of air-fuel ratio inversions on the downstream side of the catalyst and a number of air-fuel ratio inversions on the upstream side of the catalyst.

6. The device as defined in claim 5, wherein the catalyst is determined to have deteriorated when the ratio of the number of air-fuel ratio inversions on the downstream side of the catalyst to the number of air-fuel ratio inversions on the upstream side of the catalyst is greater than a predetermined value.

7. The device as defined in claim 1, wherein the value expressing the difference in the air-fuel ratio variation on the upstream side and the downstream side of the catalyst is a ratio of an air-fuel ratio inversion cycle on the upstream side of the catalyst and an air-fuel ratio inversion cycle on the downstream side of the catalyst.

8. The device as defined in claim 5, wherein the catalyst is determined to have deteriorated when the ratio of the air-fuel ratio inversion cycle on the upstream side of the catalyst to the air-fuel ratio inversion cycle on the downstream side of the catalyst is greater than a predetermined value.

9. The device as defined in claim 1, wherein the upstream side sensor is either a wide range air-fuel ratio sensor or an oxygen sensor.

10. The device as defined in claim 1, wherein the downstream side sensor is either a wide range air-fuel ratio sensor or an oxygen sensor.

11. The device as defined in claim 1, wherein the catalyst comprises a catalyst which carries a precious metal.

12. A catalyst deterioration diagnosing device comprising:
an exhaust gas purification catalyst provided in an exhaust passage of an engine;
means for detecting a characteristic value of an exhaust gas on an upstream side of the catalyst;
means for detecting a characteristic value of the exhaust gas on a downstream side of the catalyst;
means for determining the engine air-fuel ratio operating condition;
means for determining, when the engine air-fuel ratio operating condition is determined to be a non-stoichiometric air-fuel ratio operating condition, whether the catalyst has deteriorated on the basis of a value expressing a difference in an oxygen concentration on the upstream side and an oxygen concentration on the downstream side of the catalyst, determined from the two detected characteristic values; and means for feedback-controlling an air-fuel ratio of the engine to a stoichiometric air-fuel ratio, and, when the engine air-fuel ratio operating condition is determined to be a non-stoichiometric air-fuel ratio operating condition, determine again whether the catalyst has deteriorated on the basis of a value expressing a difference in an air-fuel ratio variation on the upstream side and the downstream side of the catalyst, determined from the two detected characteristic values, when the catalyst is determined to have deteriorated on the basis of the value expressing the difference in the oxygen concentration.

13. A method of diagnosing deterioration of an exhaust gas purification catalyst provided in an exhaust passage of an engine, comprising:

detecting a characteristic value of an exhaust gas on an upstream side of the catalyst;

detecting a characteristic value of the exhaust gas on a downstream side of the catalyst;

determining the engine air-fuel ratio operating condition;

determining, when the engine air-fuel ratio operating condition is determined to be a non-stoichiometric air-fuel ratio operating condition, whether the catalyst has deteriorated on the basis of a value expressing a difference in an oxygen concentration on the upstream side and an oxygen concentration on the downstream side of the catalyst, determined from the two detected characteristic values; and when the engine air-fuel ratio operating condition is determined to be a non-stoichiometric air-fuel ratio operating condition, and the catalyst is determined to have deteriorated on the basis of the value expressing the difference in the oxygen concentration, feedback-controlling an air-fuel ratio of the engine to a stoichiometric air-fuel ratio, and determining again whether the catalyst has deteriorated on the basis of a value expressing a difference in an air-fuel ratio variation on the upstream side and the downstream side of the catalyst, determined from the two detected charateristic values.

14. The device as defined in claim 12 further comprising, means for, when the engine air-fuel ratio operating condition is determined to be a stoichiometric air-fuel ratio operating condition, feedback-controlling the air-fuel ratio of the engine to the stoichiometric air-fuel ratio, and means for determining whether the catalyst has deteriorated on the basis of the value expressing the difference in the air-fuel ratio variation, without determining whether the catalyst has deteriorated on the basis of the value expressing the difference in the oxygen concentration.

15. The method as defined in claim 13 further comprising, when the engine air-fuel ratio operating condition is determined to be a stoichiometric air-fuel ratio operating condition, feedback-controlling the air-fuel ratio of the engine to the stoichiometric air-fuel ratio, and determining whether the catalyst has deteriorated on the basis of the value expressing the difference in the air-fuel ratio variation, without determining whether the catalyst has deteriorated on the basis of the value expressing the difference in the oxygen concentration.

16. The device as defined in claim 12, wherein the value expressing the difference in the air-fuel ratio variation on the upstream side and the downstream side of the catalyst is a ratio of a number of air-fuel ratio inversions on the downstream side of the catalyst and a number of air-fuel ratio inversions on the upstream side of the catalyst.

17. The method as defined in claim 13, wherein the value expressing the difference in the air-fuel ratio variation on the upstream side and the downstream side of the catalyst is a ratio of a number of air-fuel ratio inversions on the downstream side of the catalyst and a number of air-fuel ratio inversions on the upstream side of the catalyst.

18. The device as defined in claim 1, wherein the controller feedback-controls the air-fuel ratio of the engine to the stoichiometric air-fuel ratio, when the engine air-fuel ratio operating condition is determined to be a lean or rich air-fuel ratio operating condition and the catalyst is determined to have deteriorated on the basis of the value expressing the difference in the oxygen concentration.

19. The device as defined in claim 12, wherein the means for feedback-controlling feedback controls the air-fuel ratio of the engine to the stoichiometric air-fuel ratio, when the engine air-fuel ratio operating condition is determined to be a lean or rich air-fuel ratio operating condition and the catalyst is determined to have deteriorated on the basis of the value expressing the difference in the oxygen concentration.

20. The method as defined in claim 13, wherein the method feedback-controls the air-fuel ratio of the engine to the stoichiometric air-fuel ratio when the engine air-fuel ratio operating condition is determined to be a lean or rich air-fuel ratio operating condition and the catalyst is determined to have deteriorated on the basis of the value expressing the difference in the oxygen concentration.

* * * * *